3,136,341
MULTIPLE ORIFICE FITTING

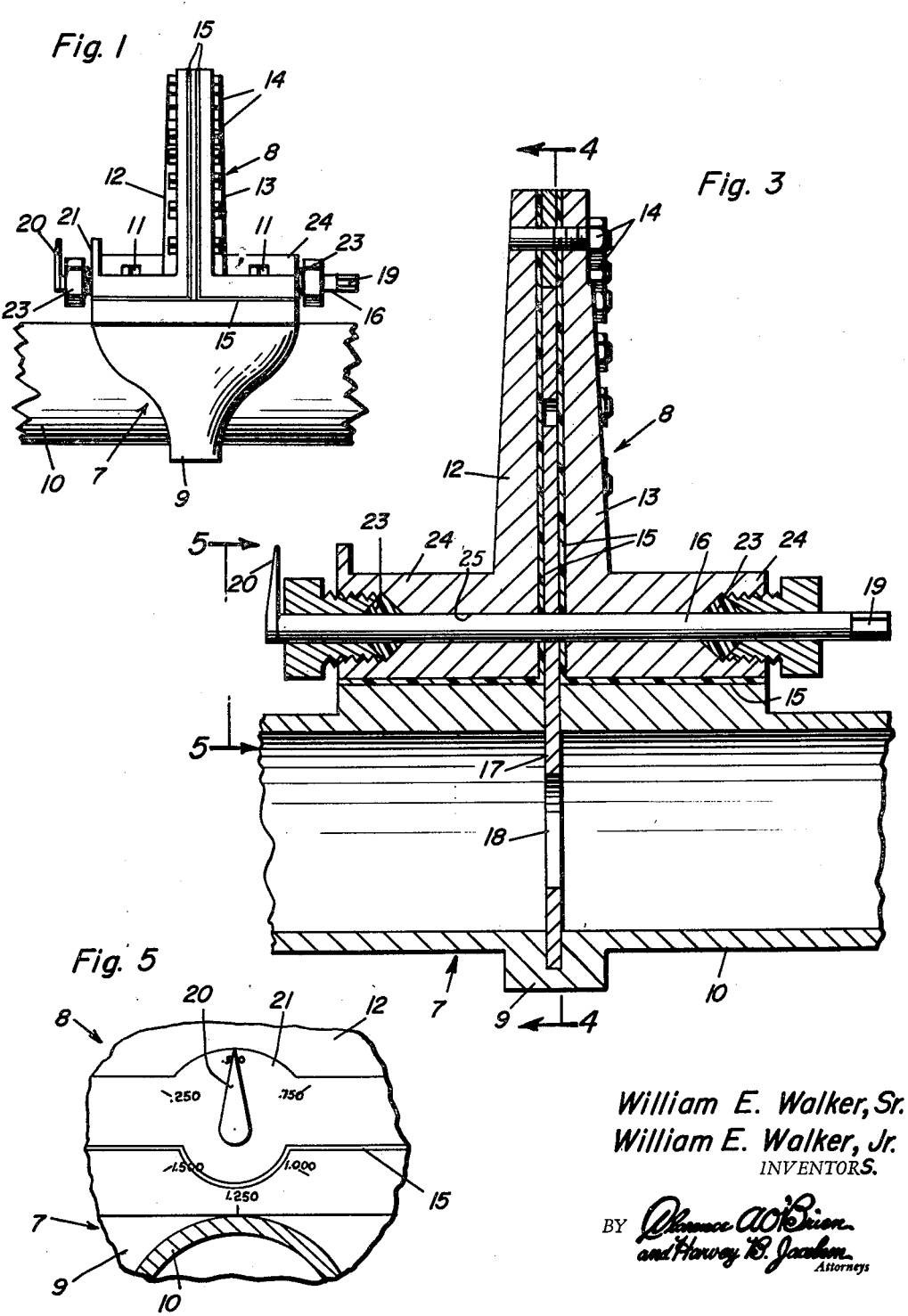

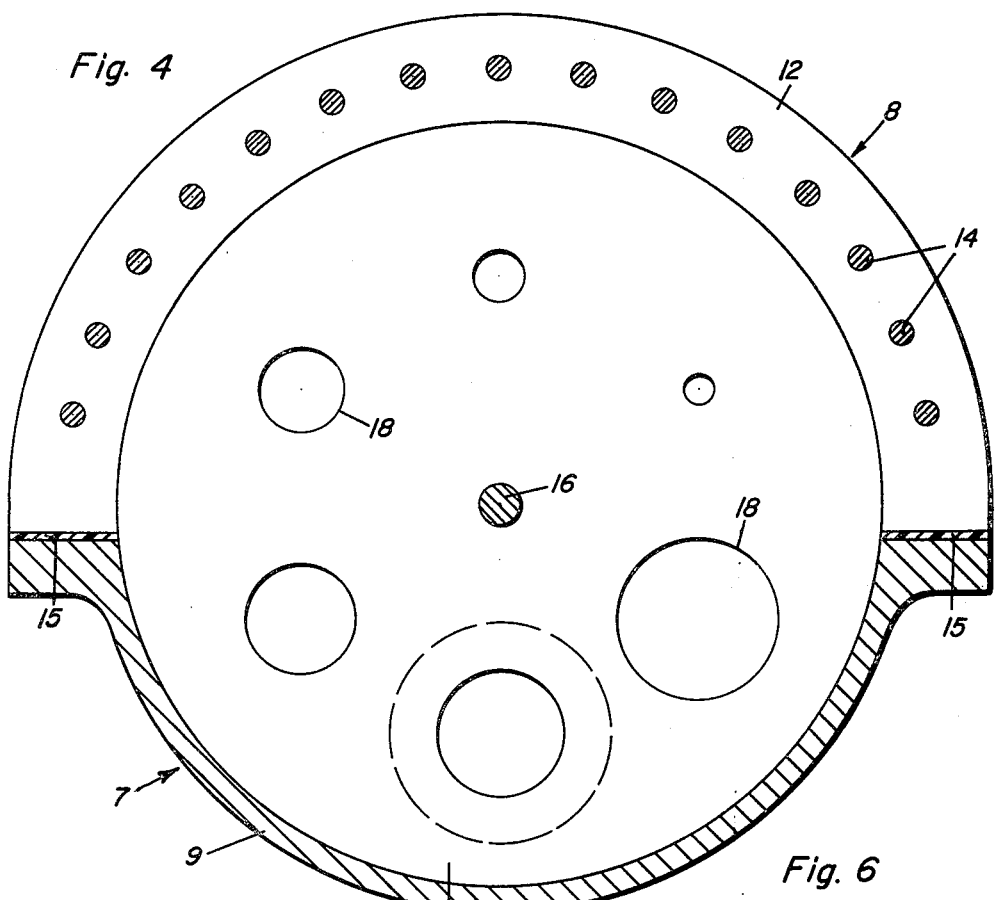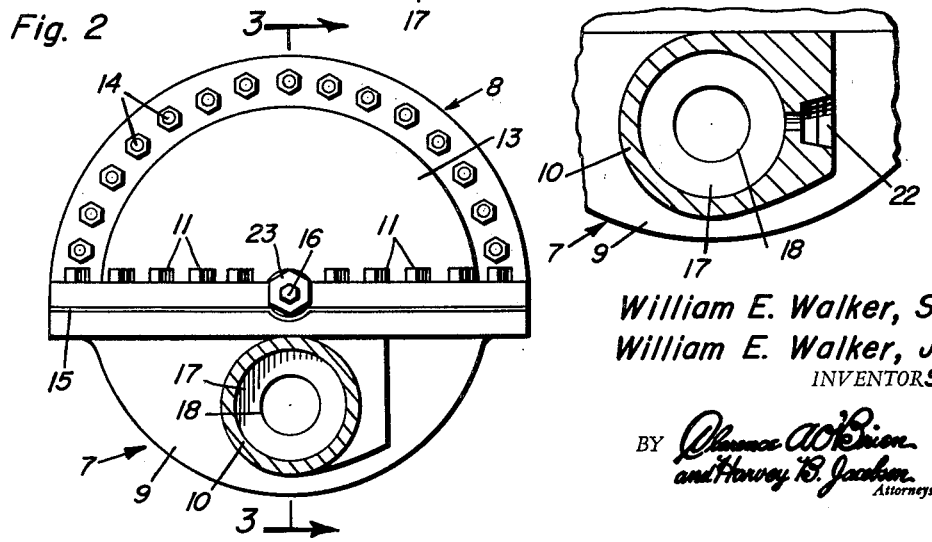

William E. Walker, Sr., Box 57, Artesia Wells, Tex., and William E. Walker, Jr., Box 201, Freer, Tex., assignors of one-tenth to James M. Burdine, Freer, Tex.
Filed June 26, 1961, Ser. No. 119,413
12 Claims. (Cl. 138—45)

This invention relates to new and useful improvements in orifice fittings for use in measuring the flow rate of natural gas especially through pipes or conduits.

In measuring the flow of large quantities of natural gas, it is customary to pass the flow through a constriction in a pipe or conduit, measure the difference in pressure between the two sides, of the constriction, and to determine the flow rate by calculation. Given the size of the orifice, the positive pressures and the differential pressure, the flow rate for a gas of known properties may be readily and accurately calculated, and may be taken from established and well-known tables.

The constriction used for this purpose usually takes the form of an orifice or round hole in a plate of hard and relatively thin metal, said plate being clamped between flanges interposed in the pipe or conduit through which the flow is being conducted, the plate being so placed between these flanges that the orifice is substantially concentric with the pipe. In order to change from one orifice to another, it is necessary, with the arrangements heretofore used, to shut off the flow on each side of the flanges by means of valves, to slacken or remove the bolts holding the flanges together, to remove one plate and substitute another, and to again make up the flanges. The operation is laborious, at times dangerous and, further, the stoppage of the flow is often highly detrimental to operations in which the continuous flow of gas is essential.

Accordingly, the primary object of the present invention is to provide, in a manner as hereinafter set forth, novel means whereby orifices of various sizes may be expeditiously and safely brought into position for use by simply turning a rotary disk or plate in either direction.

Another very important object of the present invention is to provide an improved fitting of the aforementioned character wherein the orifices may be changed without shutting off the flow of gas.

Still another important object of the invention is to provide a multiple orifice fitting of the character set forth comprising novel means for indicating which of the several orifices is in use.

Still another object of the present invention is to provide a multiple orifice fitting of the character described wherein the rotatably adjustable disk or plate may be removed for inspection or other purposes without removing the complete fitting from the line.

Other objects of the invention are to provide an improved multiple orifice fitting which will be comparatively simple in construction, strong, durable, compact, of light weight and which may be manufactured at low cost.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a view in side elevation of an improved multiple orifice fitting constructed in accordance with the present invention;

FIGURE 2 is an elevational view, looking at the intake side of the device with the pipe in cross-section;

FIGURE 3 is a view in vertical longitudinal section on an enlarged scale, taken substantially on the line 3—3 of FIGURE 2;

FIGURE 4 is a cross-sectional view through the device, taken substantially on the line 4—4 of FIGURE 3;

FIGURE 5 is a fragmentary view principally in elevation, showing the orifice indicating means; and FIGURE 6 is a detail view in cross-section, showing one of the meter taps.

Referring now to the drawing in detail, it will be seen that the embodiment of the present invention which has been illustrated comprises a fitting assembly of suitable metal which is designated generally by reference numeral 7. The assembly 7 comprises upper and lower sections 8 and 9, respectively. The assembly 7 is adapted to be interposed in a gas line (not shown). Toward this end, the lower conduit section 9 includes an integral pipe 10 having a straight constant diameter flow section which is installed and secured in the line in any suitable manner. Bolts 11 removably secure the upper housing section 8 on the lower section 9. The upper housing section 8 includes complementary half-sections 12 and 13 which are removably secured together by bolts 14 extending through an arcuate spacer as shown in FIGURE 3. Suitable sealing gaskets 15 may also be provided between the surfaces on the upper and lower sections 8 and 9 and between the half-section plates 12 and 13 of said upper section 8.

Extending rotatably through axially aligned journal bores 25 the lower portion of the upper housing section 8 is a shaft 16 which parallels the pipe 10. Fixed on the shaft 16 for rotation therewith is a circular plate or disk 17 of suitable rigid material such as metal. As illustrated to advantage in FIGURE 3 of the drawing, the disk 17 extends through a slot formed in the section 9 across the flow passage of pipe 10 and is rotatably received in the internal groove formed in the enlarged wall portion of section 9 for such purpose. Continuous flow establishing means is provided in the form of a plurality of circular holes, passages or orifices 18 to be brought selectively into registry with the flow passage of pipe 10. As shown in FIGURE 4 of the drawing, the orifices 18 are of various diameters and said orifices are so located in the disk 17 as to be centered in the pipe 18 when said disk is properly rotatably adjusted. Furthermore, the orifices 18 are so arranged and spaced circumferentially in the disk 17 that at least one of said orifies is always in communication with the pipe 10. Thus, the flow of gas is never completely shut off.

The shaft 16 includes a projecting polygonal end portion 19 for receiving a suitable turning tool. Fixed on the other end of the shaft 16 is an indicator or pointer 20. The pointer 20 is readable against a dial or the like 21 (see FIGURE 5) on the adjacent portion of the housing 8 for indicating the size of the orifice 18 which is in registry with the pipe 10.

On opposite sides of the disk 17 the lower section 9 is tapped, as indicated at 22 (see FIGURE 6) for connecting pressure indicating meters (not shown) to the fitting.

It is thought that the operation of the device will be readily apparent from a consideration of the foregoing. The fitting is primarily for use in conjunction with an orifice meter for gas measurement, particularly natural gas. To reduce pressure on the intake side of the disk, said disk is rotated to bring the next larger orifice into registry. Of course, when the differential pressure on the intake side of the disk becomes too low, said disk is rotated in the opposite direction to bring into registry the next smaller orifice. Rotation of the shaft 16 with the disk 17 thereon is readily accomplished manually by applying a wrench or other suitable tool to the polygonal end portion 19 of said shaft. Or, if desired, the shaft 16 may be rotated automatically and from a remote point. Suitable packing glands 23 are provided in the journal hub portions 24 of the housing plate sections 12 and 13 for preventing leakage through the journal bores 25 at the end portions of the shaft 16. By simply unscrewing the bolts 11, the upper housing section 8 with the orifice disk 17 therein may be readily removed, leaving the lower housing section 9 undisturbed in the line. The device may be of any desired dimensions to be interposed in various sizes of pipes and the disk 17 may comprise any suitable number of orifices.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An orifice fitting comprising a housing to be interposed in a gas line, said housing having an inlet and an outlet, a disk rotatably mounted in the housing establishing continuous restricted flow between said inlet and outlet and having therein a multiplicity of orifices of various sizes selectively registrable with the inlet and outlet, means for rotatably adjusting the disk without interruption of said flow, and means for indicating which one of the orifices is in axial alignment with said inlet and outlet.

2. An orifice fitting comprising a housing to be interposed in a gas line, said housing having an inlet and an outlet, a disk rotatably mounted in the housing establishing continuous restricted flow between said inlet and outlet and having therein a multiplicity of orifices of various sizes selectively registrable with the inlet and outlet, means for rotatably adjusting the disk without interruption of said flow, and means for indicating which one of the orifices is in axial alignment with said inlet and outlet, the last-named means including a dial on the housing, and a pointer rotatable in unison with the disk and adapted to be read against said dial.

3. An orifice fitting comprising, a housing including a pipe interposed in a flow line, a shaft rotatably mounted in the housing about a fixed axis, a rotatably adjustable disk fixed on the shaft and completely enclosed within the housing, continuous flow establishing means in said disk including a plurality of orifices having different diameters, said orifices being so arranged circumferentially in the disk that at least one of said orifices is always in communication with the pipe whereby flow is never completely shut off, and means for indicating adjusted positions of the disk with said orifices in axial alignment with the pipe.

4. An orifice fitting in accordance with claim 3, wherein said means includes a dial on the housing, and a pointer on one end portion of the shaft cooperable with the dial.

5. An orifice fitting in accordance with claim 4, wherein said shaft parallels the pipe and includes an exposed end portion of polygonal cross-section for receiving a turning tool.

6. An orifice fitting comprising a housing including a pipe having a flow passage to be interposed in a gas line, and a disk mounted in sealed relation in the housing for rotary adjustment and having therein a multiplicity of circumferentially spaced openings of various sizes selectively registerable with the pipe, at least one of said orifices being in communication with said flow passage in any position of the disk.

7. An orifice fitting comprising a housing including a lower section comprising a pipe having a straight flow passage, said housing further including an upper section removably secured on said lower section, said upper section comprising separable, complementary half-sections, a shaft journaled in the upper section for free rotation about a fixed axis, and a disk fixed to said shaft for rotatable adjustment in sealed relation within the housing and traversing the pipe, and flow establishing means on said disk including a multiplicity of spaced orifices of various sizes selectively registerable with the flow passage without interruption of flow.

8. A flow control device adapted to be mounted adjacent to a flow passage which comprises a pair of opposed cover plates having aligned journal bores extending therethrough, an orifice disc disposed between said cover plates and having a plurality of orifices extending therethrough, adjustment means extending through said journal bores for pivotally mounting said orifice disc between said cover plates with one of said orifices radially spaced from the cover plates in alignment with said flow passage, means to clamp said cover plates in spaced relation to each other and to the flow passage for sealing said disc in free rotatable relation therebetween with at least one of said orifices communicating with said flow passage for any position of the disc.

9. A flow control device adapted to be connected to a flow line comprising, a conduit section having a mounting surface portion through which a slot extends in communication with a flow passage aligned with said flow line, housing means mounted on said mounting surface portion to define a fluid sealed chamber eccentrically spaced with respect to said flow passage and communicating therewith through said slot, disc means freely rotatably mounted in sealed relation within said chamber having a portion projecting through said slot for intersection of said flow passage, and restricted flow establishing means mounted on said disc means to change the flow rate of fluid through said flow passage without interruption of flow in response to rotation of the disc means between adjusted positions.

10. The combination of claim 9 wherein said mounting surface portion of the conduit section comprises an enlarged wall formation of the conduit section having an internal groove for rotatably receiving said projecting portion of the disc means, and a surface formed on said enlarged wall formation on one side of the conduit section for seating the housing means to expose the slot thereto, said slot being coplanar with the internal groove.

11. The combination of claim 10, wherein said housing means comprises a pair of axially spaced hub portions mounted on the mounting surface portion for rotatably mounting said disc means, flanges connected to said hub portions, and spacing seal means interconnecting said flanges for sealing said chamber in coplanar relation to the slot.

12. The combination of claim 9, wherein said housing means comprises a pair of axially spaced hub portions mounted on the mounting surface portion for rotatably mounting said disc means, flanges connected to said hub portions, and spacing seal means interconnecting said flanges for sealing said chamber in coplanar relation to the slot.

References Cited in the file of this patent
UNITED STATES PATENTS

| | | |
|---|---|---|
| Re. 25,052 | Burkland et al. | Oct. 10, 1961 |
| 1,253,143 | Caldwell | Jan. 8, 1918 |
| 1,822,961 | Emery | Sept. 15, 1931 |
| 1,982,754 | Peterson | Dec. 4, 1934 |
| 2,477,025 | Weitzen | July 26, 1949 |
| 2,536,275 | Godshall | Jan. 2, 1951 |
| 2,994,344 | Kerley | Aug. 1, 1961 |
| 3,079,796 | Freudenthal et al. | Mar. 5, 1963 |